United States Patent Office

Re. 25,231
Reissued Aug. 21, 1962

25,231

ANGEL FOOD CAKE MIX

Thomas P. Finucane, Hartsdale, N.Y., William A. Mitchell, Lincoln Park, N.J., and Leonard Z. Raymond, White Plains, N.Y., assignors to General Foods Corporation, White Plains, N.Y., a corporation of Delaware No Drawing. Original No. 2,916,380, dated Dec. 8, 1959, Ser. No. 794,246, Feb. 19, 1959. Application for reissue Dec. 6, 1961, Ser. No. 158,936
15 Claims. (Cl. 99—94)

Matter enclosed in heavy brackets [ ] appears in the original patent but forms no part of this reissue specification; matter printed in italics indicates the additions made by reissue.

This invention relates to angle food cake mixes.

Angel food cakes are generally considered the most difficult of achievement among the better-known household food preparations. The recent development of cake mixes in this field, however, has largely eliminated the difficulties involved in preparing such cakes, while assuring the housewife of reproducible, satisfactory results.

The angel food cake mixes which are presently available to the consumer comprise at least two packages, one of which contains dried egg white, sugar, and sometimes additives such as cream of tartar, partially degraded soy protein and sodium hexametaphosphate. The second package contains a farinaceous ingredient, additional sugar, and sometimes additives such as cream of tartar and flavoring. To prepare a cake from such a mix, water is added to the ingredients of the package containing the dried egg white to reconstitute it, the egg white is whipped to a stable foam and the ingredients of the second package are sifted and gently folded into the foam. The batter thus prepared is ready for baking.

Commercially only two package mixes are available. The average housewife loses potential cake volume and quality as compared to the results obtained with the same mix when used in the laboratory. The two package mixes presently available on the market are extremely sensitive to variations in formulation and recipe, particularly variations in flour, egg white, the amount of heating of the reconstituted egg white, the folding in of the flour, the presence of a fat film on the equipment employed, and the like. For this reason industry has been seeking methods to improve the results obtained from two package mixes when they are used under ordinary household conditions. Any simplification in the use of the two package angel food mix would considerably improve the results obtained by the housewife.

The ultimate in simplicity would require that the difficulty involved in preparing the foam and subsequently folding in the other ingredients such as flour and sugar be eliminated. A dry mix which could be used to prepare a batter simply by adding water and mixing has been sought by the industry but has been impossible of achievement heretofore. The first requirement of a single package mix, namely, that it be whipped to a stable foam could not be met because egg white could not be whipped in the presence of the flour required for the cake. This fact has necessitated maintaining the flour separately from the egg white until the egg white has been whipped to a stable foam. Then the flour must be sifted and gently folded into the whipped egg white to prevent it from collapsing.

Objects of the present invention include the provision of a single package mix from which an angel food cake batter can be readily prepared simply by the addition of water and beating. Another important object is the provision of single package angel food cake mixes which have an improved tolerance with respect to variations in the ingredients making up the mixes and also variations in the manner in which the mixes are employed in the preparation of angel food cakes. Additional objects include the provision of angel food cake mixes requiring relatively short beating or whipping times in the preparation of the foam batter, mixes which can be readily and easily prepared by hand mixing as well as machine mixing and mixes which provide cakes of increased volume and improved texture and quality. An additional object is the provision of a farinaceous ingredient such as flour and/or starch uniquely advantageous in preparing an angel food cake. Other objects will be apparent from the discussion that follows hereinafter.

It has now been discovered that an angel food cake mix meeting the above requirements can be obtained by providing a mix containing egg white, sugar, a farinaceous ingredient and a fatty anti-foaming agent wherein the aggregate level of the fatty anti-foaming agent present is below that level at which the egg white will not whip into a foam batter of substantial volume in the presence of the other mix ingredients and the cells of the egg white foam batter produced upon whipping will not expand sufficiently upon baking, said level being above that level at which excessive swelling of the foam batter on baking and subsequent collapse of the cake on cooling is prevented. The fatty anti-foaming agent which may be typically a fat or a fatty acid is introduced by means of the flour or, where starch or a relatively fat-free flour is employed, by adding the fat or fatty acid to the flour or starch. When the anti-foaming agent is present at a level of 0.04–9.0% by weight of the *dried* egg white in the mix, the aforementioned objectives are attained.

As used in the present invention, the term "farinaceous ingredient" refers to all of the various starches, flours and mixtures of the same obtained from cereals, tubers, roots and the like. When flour is the farinaceous ingredient employed, its fat content must be reduced although not completely eliminated if the benefits of the present invention are to be realized. This reduction can be effected by solvent extraction or by dilution of the flour with the relatively fat-free starch. The reduction provides for the first time a single package angel food cake mix characterized by the aforementioned advantages and capable of providing the ultimate in convenience.

Cake flour, a fraction of wheat flour, generally contains about 1.3% fat as determined by the acid hydrolysis method, about 0.8% as determined by extraction with hexane and about 1.1% as determined by extraction with ethanol (95%). The hexane-extractable fat in starch is about 0.2% and that in the extracted flour discussed hereinafter is about 0.3%. The fat is only partially extracted from the flour using ethanol (95%) because exhaustive extraction is impractical. Flour extracted by other solvents and to different degrees may also be employed, of course.

While the amount of fatty anti-foaming agent such as fat or fatty acid in combination with the farinaceous ingredient is for all practical purposes the element to be controlled in order to provide the results of the present invention, related materials such as soaps, fatty acid amides, lipids, lipo proteins, mineral oils, fatty alcohols, fatty esters, waxes, phospholipids, and the like, function in an equivalent manner.

Replacing as much as 40% of the flour with starch and thereby reducing the fat content of the mix does not provide *a mix capable of attaining the objectives of* a single package angel food cake mix. But, a mixture of 60 parts by weight of starch and 40 parts by weight of regular flour [provides a single package] *does provide such a* mix.

Experience with the various formulations capable of providing [a single package] *the desired* mix indicates that the flour fat as determined by hexane extraction that may be contained in the mix and provide the [single package mix and the other] advantages of the present invention is of the order of 0.04–1.5% by weight of the dried egg white in the mix. Cakes prepared from mixes containing the lower levels of fat are more susceptible to implosion and cakes prepared from mixes containing the very high levels of fat are fine textured and low in volume. This experience also indicates that when a fatty acid such as stearic acid is employed as the fatty anti-foaming agent in a cake mix containing starch as the sole farinaceous ingredient, then the stearic acid may be employed at a level of 0.9–9.0% by weight of the dried egg white in mix and preferably at a level of 4.0–5.0% by weight of the dried egg white in the mix. Cakes prepared from mixes containing the lower levels of fat are more susceptible to implosion and cakes prepared from mixes containing the very high levels of fat are fine textured and low in volume. Cakes prepared from mixes containing the preferred level of stearic acid have the best volumes and textures. Furthermore, it is possible to employ either stearic acid by itself or a combination of stearic acid and other fatty acids or fats to obtain the desired result. While other anti-foaming agents such as those mentioned specifically above should be employed in somewhat different amounts, said amounts will be of the same order of magnitude and can be readily determined by baking cakes from a series of mixes containing progressively increasing amounts of such other anti-foaming agents.

Even with a particular anti-foaming agent such as the hexane extractable flour fat or a fatty acid to which the present invention is particularly directed, the optimum levels to be employed depend upon other factors such as the distribution of the anti-foaming agent, whether it is contained on the surface of the flour or other carrier or is held within the flour granule, the ratio of farinaceous ingredient to egg white and other factors. For example, the optimum amount of fat is lowered when a higher ratio of flour or other farinaceous ingredient to egg white is employed.

It is also possible to achieve the results provided by the present invention by controlling the activity or, perhaps more correctly, the point in the whipping and baking process at which the foam inhibitor becomes effective. Such control may be provided by employing a solid fat or fatty acid which does not become liquid until the baking stage of the cake preparation so that it does not interfere with the egg white foam at the time of whipping but does serve to control its volume and thereby to insure a strong cell structure development during the subsequent baking step. Similar results may be obtained by coating or encapsulating the fat content of the mix with a water-soluble material which is relatively slow to dissolve at lower temperatures such as gelatin, pectin, gum arabic, and the like. Here again, the fat does not come into play until after the whipping is largely accomplished or during the baking step.

In addition to the wheat flour and starch normally employed in angel food cake mixes, flours and starches derived from other materials such as corn, rice, arrowroot, potato, tapioca, sago, sorghum, soy, and the like may also be employed. Such materials will seldom be used by themselves but more often in combination with each other and most likely in combination with wheat starch or wheat flour. Their use presents slightly different problems in connection with controlling the fat content of the mix. For example, potato starch is practically devoid of fat whereas soy flour is relatively high in fat content as are the other grades of wheat flour that are not ordinarily employed as cake flour.

In general, the farinaceous ingredient in the case of a mix containing about 40 g. of dried egg white may range between 75 g. and 175 g. A cake containing more than this amount of farinaceous ingredient will be unacceptable because of a necessary, concomitant reduction in sugar level and also because the resulting cake will have a tough, gummy texture. On the other hand, a cake containing less than 75 g. of farinaceous ingredient will have a weak texture which usually collapses on cooling after baking.

The amount of sugar employed in the mix is not critical, being determined by taste considerations for the most part. It is preferred to employ sucrose of a particle size commonly designated as "coating sugar" and in the amount of from 100 g. to 300 g. where a cake mix containing about 40 g. of dried egg white is concerned. Also, it has been found advantageous in some cases to replace a small proportion of the sucrose with dextrose, e.g., 10 g., since this imparts a light brown color to the cake crust which is considered desirable.

While the above discussion of the manner in which the different ingredients of a foam batter cake mix may be varied has been based on a mix containing 40 g. of dried egg white, it should be pointed out that the dried egg white can also be varied over an appreciable range. In the case of a 14–17 oz. angel food cake mix the dried egg white may vary within the range of 35–45 g. An amount of egg white appreciably below this range cannot be employed without encountering a large number of cake failures. On the other hand, an amount of egg white appreciably in excess of the aforementioned 45 g. not only introduces great additional expense but, also, can result in cakes having an undesirably rubbery texture.

There are several different ways in which the flour fat content of the foam batter cake mix may be controlled. These include:

(1) The use of partially extracted flour having the desided fat content.

(2) A more completely extracted flour or a starch to which flour fat has been added either to all of the flour or starch or to a portion thereof.

(3) Combinations of starch with regular, untreated flour.

(4) Combinations of extracted flour with regular, untreated flour.

It is somewhat difficult to control the fat content in the case of the first embodiment mentioned above and greater ease of control is encountered with the second embodiment. Here, however, care should be taken to secure the uniform distribution of the flour fat added back to the extracted flour. This can be accomplished by adding the dissolved fat to the flour or starch uniformly, removing the solvent by evaporation and further insuring uniform distribution by tumbling the flour or starch or otherwise mixing it. Likewise, good mixing, as by tumbling, should be employed in the third and fourth embodiments above in order to secure uniform distribution of the regular, untreated flour throughout the starch or extracted flour.

When a fatty acid is employed in combination with starch or flour its effect may be controlled by dry blending it with the farinaceous ingredient or by coating it on the farinaceous ingredient. When stearic acid is the fatty acid employed, it is preferred to dry blend it in a finely powdered form with the farinaceous ingredient.

In employing regular, untreated flour with starch in a [single package] mix [containing] *embodying the present invention which contains* 40 g. of dried egg white, the flour may range from as little as 0% to as high as 40% of the farinaceous ingredient, the remainder being starch, provided the hexane-extractable fat in the mix is maintained at 0.04–1.5% by weight of the dried egg white in the mix. It is preferred, however, to employ the flour in a range of about 5–20%. This generally provides hexane-extractable fat in an amount equal to about 0.5–1.0% of the dried egg white. Where regular, untreated flour is employed in combination with, say, ethanol extracted flour containing about 0.3% hexane-extractable fat, it is preferred to employ the unextracted flour in a range of about 25–40% of the farinaceous ingredient which generally provides hexane-extractable fat equal to about 1.2–1.5% of the dried egg white in the mix.

In addition to controlling the anti-foaming agent, particularly the flour fat or added fatty acid, contained in an angel food cake mix, it has been discovered that an additional factor of considerable practical importance in the provision of [the single package] *a* mix *embodying the present invention* is the use of a whipping agent such as a hydrolyzed soy protein, e.g., that which is currently marketed as "Whitson's 100" (U.S. Pat. No. 2,588,419). Other such whipping agents are shown in U.S. Pats. Nos. 2,489,173, 2,489,208, 2,502,029 and 2,502,482. Such materials are capable of being whipped into a foam upon the addition of water and, therefore, their use provides foam in addition to that of the egg white. Such foams appear to add considerable strength to the egg white foam so that the other solids of the cake mix are better carried by the foam. In any event, and perhaps related to the improved carrying ability of the foam, the use of such agents greatly reduces the amount of whipping or beating required to prepare the foam batter. This is not of particular importance when a mechanical mixer is employed but, obviously, is a large practical consideration when hand beating or whipping is used. From a practical standpoint, an additional result is to increase the volume and improve the quality and texture of the cake when the mix is employed by the housewife, since its use reduces the amount of working required for optimum results and thereby assures the housewife's being able to obtain optimum results with greater frequency. In many angel food cake mixes such as those detailed in the specific examples set forth below, beating or whipping for as long as 10–15 minutes is required when a whipping agent such as "Whitson's 100" is not present in the mix, whereas, when such an agent is present, the time required for optimum results is reduced to 5 minutes.

The flour fat or lipid and stearic acid requirements for [a] *an* [single package] angel food cake mix *embodying the present invention* were determined by employing a basic formulation consisting of starch, sugar, egg white, and cream of tartar, with the fatty anti-foaming agent being the variable in the basic formulation. A standard procedure for incorporating the fatty material on the starch was established which gave a good dispersion of the fatty material over the starch surface. It should be noted here, however, that the anti-foaming agent [lever] *level* determined is restricted to the conditions used to apply the fat to the starch surface. The critical level will change with the method of coating the formulation and the presence of foam weakening agents such as hydrolyzed proteinaceous extracts like hydrolyzed soy protein. When all of these variables are taken into consideration an optimum film strength necessary in the egg white foam will be determined. The film strength is optimum when the effect of the anti-foaming agent is such that the egg white can be whipped in the presence of the farinaceous material and the condition of the protein cells created during whipping will be sufficiently weak or thin so as to insure against over-expansion while being insufficiently strong or thick so as to assure adequate expansion of the batter upon baking.

The farinaceous ingredient selected in this particular study was flour starch which does contain some lipid, which lipid was extracted from the starch prior to its employment as part of the basic angel food cake mix formulation. This extraction involved adding 25 lbs. of flour starch to 11.3 gals. of 80% methanol and heating to 65° C. in a steam jacketed stainless steel kettle with constant stirring. The temperature was maintained at 65° C. for 0.5 hour and then the slurry was cooled to 30° C. The slurry was then transferred to a vacuum filter and the solvent removed. This was followed by two washings of the filter cake with 1 gal. of 80% methanol, the filter cake was then re-extracted using the same technique as before. The filter cake was then dried on paper-covered strainer in a Proctor and Schwartz dryer at 70° C. A total of 100 lbs. of fat extracted starch was so prepared. This method results in the removal of 95% of the methanol-extractable lipid.

A coating procedure which assured a uniform surface coating of lipid on the starch surface was developed. This procedure involved introducing starch by means of a blast of compressed air in the form of a dust or cloud into an air sack in the form of a polyethylene bag having a suitable silk screen air vent. Simultaneously the anti-foaming agent was atomized into the chamber and onto the starch cloud, the rate of spraying being synchronized to the starch feed to assure a uniform application. The coated starch was then removed from the polyethylene bag and weighed.

Following the starch coating operation the ingredients necessary for preparing a cake mix were placed in a suitable mixing bowl and blended. The cake mix comprised the following:

| | Grams |
|---|---|
| Starch | 100.0 |
| Sugar | 250.0 |
| Cream of tartar | 1.8 |
| Dried egg albumin | 39.0 |
| Dextrose | 5.0 |
| | 395.8 |

Starch with various levels of anti-foaming agent was employed in these mixes.

395.8 grams of each cake mix was added directly into a mechanical mixer containing 390 milliliters of distilled water and put into a solution by stirring with a spatula. This was followed by beating for five minutes at a high mixer speed. The level of anti-foaming agent employed in each mix was varied and the beater consistency was observed as well as the time required to beat a stiff peak which time was recorded as "whipping time." At the end of the beating period the height of the batter *foam* from the top of a mixing bowl was recorded, the size of the bowl being 9 inches in diameter. The batter was then transferred to a 9 inch diameter standard angel food cake pan, the air pockets being removed from the batter by passing a spatula therethrough. The batter was then baked at an oven temperature of 390° F. for 30 minutes. After baking the cake was removed from the cake pan and inverted over a suitable support and then cooled for 1 hour. The height of the cake was recorded before removal from the pan.

The foregoing testing procedure for angel food cake mixes was repeated with the exception that beating times of 10 to 15 minutes were employed instead of 5 minutes.

The flour lipid used in these experiments was obtained by extracting a bleached cake flour. Six and one-quarter lbs. of this cake flour was placed in a 5 gal. glass container together with 2 gal. of hexane, stirred for 0.5 hour, the supernatant was filtered through a Whatman No. 5 filter paper and the filter cake was washed with hexane, this procedure was repeated and the solvent fractions were combined. The solvent was then concentrated under vacuum and a nitrogen atmosphere to slightly less than 1 liter total volume. Finally the volume was adjusted by addition of hexane to 1 liter. One milliliter of this material was analyzed and found to contain 9.7 milligrams of lipid.

The influence of flour lipid upon batter formation upon baking is indicated in Table I:

upon the basic angel food cake mix formula containing 75 mg. of hexane extractable flour lipid.

The presence of the hydrolyzed soy protein makes the system initially more sensitive to the destructive effect of the lipid, by altering the type of film formed by the egg white. It also favors the formation of a foam system characterized by its greater stability and elasticity. Thus, the foam system has larger air cells in the batter stage and on baking the protein is coagulated and has sufficient stability to maintain itself in baking and cooling. The end result is a cake with larger air cells having thin cell walls.

Where stearic acid (U.S.P.) was the fatty anti-foaming

TABLE I

Influence of Flour Lipid on Batter Formation and Baking

| Flour Lipid, mg./cake | Beating Time, Minutes | Time Reqd. To Whip, Minutes | Batter Height, mm. | Baked Cake | | Comments |
|---|---|---|---|---|---|---|
| | | | | Side Height, mm. | Center Height, mm. | |
| ---------- | 5 | ---------- | 83 | ---------- | ---------- | high volume, collapsed, fell out. |
| ---------- | 10 | 5.2 | 86 | ---------- | ---------- | Do. |
| ---------- | 15 | 5.2 | 83 | ---------- | ---------- | Do. |
| .0---------- | 5 | 4.7 | 90 | ---------- | ---------- | Do. |
| .0---------- | 10 | 4.5 | 90 | ---------- | ---------- | Do. |
| .0---------- | 15 | 4.5 | 90 | ---------- | ---------- | Do. |
| 0---------- | 5 | ---------- | 78 | ---------- | ---------- | Do. |
| 0---------- | 10 | 5.8 | 90 | ---------- | ---------- | Do. |
| 0---------- | 15 | 5.2 | 89 | ---------- | ---------- | Do. |
| 0---------- | 5 | ---------- | 71 | ---------- | ---------- | Do. |
| 0---------- | 10 | 6.3 | 88 | ---------- | ---------- | Do. |
| 0---------- | 15 | 6.2 | 89 | ---------- | ---------- | Do. |
| .0---------- | 5 | ---------- | 62 | 60 | 94 | heavy wet starch layer. |
| :0---------- | 10 | 6.8 | 83 | 85 | 112 | acceptable cake fine texture. |
| :0---------- | 15 | 6.8 | 86 | 87 | ---------- | fell out. |
| 0---------- | 5 | ---------- | 62 | 60 | 88 | low volume, slight cupping. |
| 0---------- | 10 | 7.0 | 87 | 88 | 110 | acceptable cake, fine texture. |
| 0---------- | 15 | 7.0 | 89 | 89 | 111 | Do. |
| '5---------- | 5 | ---------- | 57 | 54 | 76 | low volume sl. cupping, wet starch layer. |
| '5---------- | 10 | 8.5 | 85 | 82 | 107 | acceptable cake fine texture. |
| '5---------- | 15 | 8.5 | 86 | 80 | 104 | Do. |
| .00---------- | 5 | ---------- | 56 | ---------- | ---------- | fell out. |
| .00---------- | 10 | ---------- | 74 | 72 | 100 | reduced volume cake, sl. cupping. |
| .00---------- | 15 | 10.5 | 80 | 80 | 102 | Do. |
| .25---------- | 5 | ---------- | Not Observed | ---------- | ---------- | Do. |
| .25---------- | 10 | ---------- | | ---------- | ---------- | Do. |
| .25---------- | 15 | 15.0 | | ---------- | ---------- | Do. |

TABLE II

Influence of Soy Protein on Batter Formation and Baking

| Hydrolyzed Soy Protein, gm./cake | Total Beating Time, Minutes | Time Req. to Whip, Min. | Batter Ht., mm. | Baked Cake Measurements, Side, mm. | Baked Cake Measurements, Center, mm. | Comments |
|---|---|---|---|---|---|---|
| None---------- | 5 | ---------- | 62 | 60 | 88 | low volume, close structure, fine cells. |
| None---------- | 10 | 7.2 | 87 | 90 | 111 | good volume, close structure, fine cells. |
| None---------- | 15 | 7.2 | 89 | 89 | 111 | Do. |
| ).75---------- | 5 | ---------- | 68 | 68 | 96 | low volume, close structure, fine cells. |
| ).75---------- | 10 | 6.5 | 91 | 85 | 110 | good volume, close structure, fine cells. |
| ).75---------- | 15 | 6.5 | 92 | 80 | 100 | med. volume, close structure, fine cells. |
| 1.5---------- | 5 | ---------- | 65 | 73 | 97 | low volume, slightly coarser structure. |
| 1.5---------- | 10 | 6.2 | 85 | 90 | 106 | good volume, slightly coarser structure. |
| 1.5---------- | 15 | 6.2 | 88 | 86 | 110 | Do. |
| 3.0---------- | 5 | 5.0 | 85 | 89 | 110 | good volume, medium coarse structure. |
| 3.0---------- | 10 | 5.0 | 91 | 95 | 117 | Do. |
| 3.0---------- | 15 | 4.8 | 93 | 93 | 116 | Do. |
| 4.5---------- | 5 | 3.3 | 90 | 97 | 113 | Do. |
| 4.5---------- | 10 | 3.3 | 92 | 99 | 115 | Do. |
| 4.5---------- | 15 | 3.3 | 92 | 98 | 114 | Do. |
| 6.0---------- | 5 | 2.5 | 93 | 97 | 105 | good volume, very coarse structure. |
| 6.0---------- | 10 | 2.6 | 94 | 105 | 119 | Do. |
| 6.0---------- | 15 | 2.5 | 93 | 106 | 118 | Do. |

It was found under the conditions employed that where a hydrolyzed soy protein was present in addition to the flour lipid, improved results occurred. Table II indicates the influence of varying levels of hydrolyzed soy protein agent employed, levels of 0.9–9.0% by weight of the egg white in the mix may be employed. While it has been found particularly effective in the case of flour lipid to spray or coat the antifoaming agent onto the farinaceous ingredient, in the case of stearic acid it has been found most desirable to dry blend finely powdered stearic acid with the farinaceous ingredient.

Table III indicates the influence of stearic acid upon batter formation and baking.

In contrast to flour lipid which sharply reduces baked cake volumes at levels as low as 30–50 mg. per cake, stearic acid did not appreciably alter cake volumes at levels as high as 500 mg. Beyond this concentration, however, there followed a gradual reduction in cake volume. At this level and beyond, longer periods of whipping are required to attain stiff peaks in the batter. Between 500 mg. and 1.5 g. of stearic acid per cake, no effect on whipping time was noted. At the higher levels there is a slight increase in whipping time. This indicates that stearic acid is approximately 1/50 as effective as flour lipid in its ability to control foam. The data in Table III also indicates the influence of stearic acid on batter height at various whipping times. At levels up to 500 mg. of stearic acid per cake there is no apparent destructive influence on batter height. There then follows a period of reduction in batter height followed by a recovery and a sharp reduction. This data further illustrates the relative ineffectuality of stearic acid in comparison to flour lipid which has a selective foam destruction. Stearic acid, when applied in the manner described, is ineffectual at low levels. At high levels, it does not selectively break the "weak protein" films surrounding the air incorporated by beating.

It was found that when stearic acid is employed as a powder it exerts a more selective controlling effect on the protein films surrounding the air cells which are formed upon whipping, whereas when the stearic acid is sprayed or coated on the farinaceous ingredient the same desirable results do not appear to be effected. This may be attributed to the fact that when sprayed or coated on the farinaceous ingredient the stearic acid is immediately available and thus prevents the development of the batter foam system. In contrast, when stearic acid is applied in the powdered state, it is not readily available until the cake is baked with the result that the batter foam destruction does not exceed development and a controlled stable foam system results. This permits the baking of acceptable cakes since the stearic acid becomes effective at the proper time during the baking process.

The addition of 4.5 g. of hydrolyzed soy protein to the basic mix containing stearic acid resulted in the attainment of satisfactory cakes when employing levels of 500–1500 mg. of stearic acid per cake. The time required to beat the batter into stiff peaks was in the range of 2.9 to 4.9 minutes, the stearic acid level at which acceptable cakes were obtained. In addition, batter heights on completion of the whipping period were in the high range. This demonstrates that if stearic acid is applied as a powder in the presence of a hydrolyzed soy protein desirable results may be obtained.

TABLE III

Influence of Stearic Acid on Batter Formation and Baking

| Stearic Acid, mg./cake | Beating Time, Minutes | Time Required To Whip, Minutes | Batter Height, mm. | Description |
|---|---|---|---|---|
| 0 | 5 | | 83 | High initial volume—collapsed—fell out. |
| 0 | 10 | 5.2 | 36 | Do. |
| 0 | 15 | 5.2 | 83 | Do. |
| 50 | 5 | 4.1 | 80 | Medium volume—fell out of pan on cooling. |
| 50 | 10 | 4.1 | 82 | Do. |
| 50 | 15 | 4.1 | 85 | Do. |
| 100 | 5 | 4.2 | 86 | Do. |
| 100 | 10 | 4.2 | 86 | Do. |
| 100 | 15 | 4.2 | 85 | Do. |
| 150 | 5 | 4.6 | 85 | Do. |
| 150 | 10 | 4.5 | 86 | Do. |
| 150 | 15 | 4.4 | 85 | Do. |
| 200 | 5 | 4.6 | 85 | Do. |
| 200 | 10 | 4.8 | 86 | Do. |
| 200 | 15 | 4.8 | 85 | Do. |
| 300 | 5 | 4.6 | 79 | Medium volume cakes had tendency to remain in pan but fell out with complete cooling. |
| 300 | 10 | 4.7 | 84 | Do. |
| 300 | 15 | 4.8 | 88 | Do. |
| 400 | 5 | 4.8 | 86 | Do. |
| 400 | 10 | 4.5 | 86 | Do. |
| 400 | 15 | 4.8 | 88 | Do. |
| 500 | 5 | | 75 | Cake volumes further reduced—side height 85—center 110 mm. cake remained in pan. |
| 500 | 10 | 5.3 | 82 | Cake volumes further reduced—fell out. |
| 500 | 15 | 5.3 | 85 | Do. |
| 700 | 5 | | 70 | Medium—low volume—cakes fell out. |
| 700 | 10 | 7.3 | 84 | Do. |
| 700 | 15 | 7.1 | 80 | Do. |
| 900 | 5 | | 76 | Cake remained in pan—side height 80—center 108 mm. |
| 900 | 10 | 7.2 | 81 | Medium volume—cakes fell out. |
| 900 | 15 | 7.1 | 80 | Do. |
| 1.1 gm. | 5 | | 75 | Do. |
| 1.1 gm. | 10 | 7.3 | 81 | Do. |
| 1.1 gm. | 15 | 7.2 | 82 | Do. |
| 1.3 | 5 | | 80 | Medium volume cake—remained in pan—side ht. 85—center 100 mm. |
| 1.3 | 10 | 6.8 | 84 | Medium volume cake—cake fell out. |
| 1.3 | 15 | 7.0 | 81 | Do. |
| 1.5 | 5 | | 78 | Medium volume, cakes fell out. |
| 1.5 | 10 | 6.7 | 83 | Medium volume cake remained in pan, side ht. 90, center 112 mm. |
| 1.5 | 15 | 6.8 | 85 | Medium volume cake remained in pan, side ht. 87, center 113 mm. |
| 1.8 | 5 | | 66 | Low volume cakes, fell out. |
| 1.8 | 10 | 7.8 | 81 | Do. |
| 1.8 | 15 | 7.7 | 81 | Do. |
| 2.0 | 5 | | 50 | Do. |
| 2.0 | 10 | 8.3 | 73 | Low volume cakes remained in pan, side ht. 78, center 110 mm. |
| 2.0 | 15 | 8.3 | 75 | Do. |
| 3.0 | 5 | | 55 | Very low volume cake stayed in pan, side ht. 53, center 58 mm. |
| 3.0 | 10 | 9.0 | 72 | Medium volume cake, stayed in pan, side ht. 83, center 100 mm. |
| 3.0 | 15 | 8.5 | 72 | Medium volume cake, fell out. |

TABLE IV

Influence of Stearic Acid and 4.5 gm. Hydrolyzed Soy Protein on Batter Formation and Baking

| Stearic Acid, mg./cake | Beating Time, Minutes | Time Required To Whip, Minutes | Batter Height, mm. | Baked Cake Measurements | | Comments |
|---|---|---|---|---|---|---|
| | | | | Side, mm. | Center, mm. | |
| 250 | 5 | ---------- | 87 | ---------- | ---------- | Very high volume—cakes fell out of pan. |
| 250 | 10 | 6.7 | 90 | ---------- | ---------- | Do. |
| 500 | 5 | ---------- | 87 | ---------- | ---------- | Do. |
| 500 | 10 | 4.9 | 91 | 105 | 122 | High volume cake stayed in pan, with an open porous structure and a strach layer. |
| 750 | 5 | 3.8 | 92 | 105 | 116 | Do. |
| 750 | 10 | 3.5 | 95 | 105 | 110 | Do. |
| 1,500 | 5 | 3.7 | 87 | 87 | 109 | Do. |
| 1,500 | 10 | 4.0 | 92 | 90 | 108 | Do. |

Table IV indicates the influence of hydrolyzed soy protein and stearic acid upon batter formation and baking.

As noted with the previous studies, the presence of hydrolyzed soy protein tends to reduce whipping time, increase batter height and reduce the level of anti-foaming agent needed.

As a result of the foregoing tables of data, conclusions can be reached which are not to be construed as limiting the invention but merely to be employed for purposes of attempting to understand the results obtained. It appears that initially the solids of a cake mix of the angel food cake type are either dissolved or suspended in water and with beating the batter becomes a three phase foam system consisting of water with dissolved sugar and protein, air and solids starch particles. On continued beating more air is incorporated and the foam of the batter increases. With this foam increase the protein film gradually becomes thicker and more susceptible to denaturization. The anti-foaming agent present in the mix influences both the stability and the nature of this protein film. In the absence of sufficient anti-foaming agent a batter is developed which has a large volume but is "inherently weak." Thus on baking a cell system is developed which is not stable. This "weak" cell system will then either collapse while still in the oven or on cooling. In the first case, the collapse is due to the rupture of the cells by expanding gas; in the second instance, the cells cannot maintain themselves against the shrinkage associated with cooling.

When flour lipid is present at the optimum level, batter volume and final cake volume are controlled by foam destruction which is selective in nature. The selective process apparently breaks or "pops" those air cells which are enveloped by a "weak" protein film. The resulting batter foam system then has sufficient stability to maintain itself in the baking and cooling process and a good cake results.

When an excess quantity of lipid or foam destroying agent is present, extreme foam destruction occurs. The result is that the batter does not whip for there is insufficient air incorporation. A low volume batter results. The foam system consists of thick protein films which on baking resist expansion. The resulting cake has low volume, variable cell size and is wet and soggy.

It appears that the optimum lipid level is a function of beating time. Then relatively low levels of anti-foaming agent are present, acceptable cakes may frequently be obtained if beating time is prolonged. But, when lipid is present in excess, acceptable cakes are not obtained when the beating time is reduced.

Hence, batter development for the system of the present invention may be described as a process wherein two opposing actions occur, (a) protein foam formation, and (b) lipid destruction of the developing films; acceptable cakes result only when these two processes are in appropriate balance.

The height of the baked angel food cake employing various levels of the flour lipid is generally dependent upon the whipping time employed to produce a cake. Thus, when a cake is prepared by using the 5 minute whipping time there can be insufficient air incorporation into the batter with a resulting poor volume cake. It appears that the egg white foam in this case is partially destroyed by the lipid insofar as its ability to provide a foam batter is concerned. The minimum flour lipid level will vary slightly with the beating time but generally was found in the above instances to range between 40 and 50 mg. per cake. Thus, with flour lipid levels less than 40 mg. per cake it will be observed that there was a high volume foam batter but that the eventual baked cake collapsed and fell out of the pan. On the other hand, at levels above 50 mg. flour lipid per cake the ability to develop a foam batter height was generally reduced, although an acceptable batter height producing a cake of acceptable texture and volume as well as stability could be achieved where the whipping times in the order of 10 to 15 minutes were followed. Also, as the level of flour lipid increased above the 75 mg. level per cake the volume of the cake was found to decrease and a tendency towards cupping was found to increase, although such tendencies could be partly corrected by whipping for prolonged periods. In any event, at flour lipid levels in excess of 125 mgs. per cake, the time required to whip to get any batter was of such length that it would be impractical to follow the procedure of whipping egg white in the presence of the farinaceous materials.

The following detailed examples are included to illustrate several of the preferred embodiments of the subject invention:

EXAMPLE I

A farinoceous material containing a controlled amount of fat and particularly suitable for use in preparing an angel food cake of the type described below is prepared by coating 20 g. of native wheat starch with about 0.03% [g.] of fat extracted from patent wheat flour by ethanol extraction. The starch thus treated is intimately mixed with 96 g. of native wheat starch to provide a starch containing about 0.270 g. of hexane-extractable fat which is employed in the mix described below:

| | Grams |
|---|---|
| Dried egg albumen | 43 |
| Starch | 116 |
| Sucrose | 252 |
| Cream of tartar | 2 |
| Salt | 1 |

An angel food cake is then prepared from the above-described mix by placing the mix in the bowl of a mechanical mixer (model #10 Sunbeam Mixmaster) and adding 360 cc. of water. The mixture is whipped for 10 minutes at high speed to fully develop the foam, and the batter transferred to a standard 9-inch angel food cake tin and baked at 375 F. for about 30 minutes. The resulting cake is 110 mm. in height of fine texture and, in general, of excellent quality.

EXAMPLE II

The fat control may be provided by employing a farinaceous material consisting of wheat starch. The following formula is employed:

| | Grams |
|---|---|
| Dried egg albumen | 41 |
| Native wheat starch | 125 |
| Sucrose | 200 |
| Cream of tartar | 2 |
| Salt | 1 |
| Sodium hexametaphosphate | 2 |
| Stearic acid | 2.5 |

420 cc. of water is added to the dry mix and the mixture whipped by machine (model #10 Sunbeam Mixmaster) for 5 minutes at high speed. The batter is then placed in a standard 9-inch angel food cake tin and baked at 375° F. for about 30 minutes. The resulting cake has a height of 90 mm. and the grain and general appearance is comparable to that prepared using a conventional angel food cake mix.

EXAMPLE III

The fat control may be provided by employing a farinaceous material consisting of wheat starch and patent wheat or cake flour. The following formula is employed:

| | Grams |
|---|---|
| Dried egg albumen | 41 |
| Patent wheat flour | 6 |
| Native wheat starch | 125 |
| Sucrose | 200 |
| Cream of tartar | 2 |
| Salt | 1 |
| Sodium hexametaphosphate | 2 |
| Calcium stearate | 0.05 |

420 cc. of water is added to the dry mix and the mixture whipped by machine (model #10 Sunbeam Mixmaster) for 5 minutes at high speed. The batter is then placed in a standard 9-inch angel food cake tin and and baked at 375° F. for about 30 minutes. The resulting cake has a height of 90 mm. and the grain and general appearance is comparable to that prepared using a conventional angel food cake mix.

While the present invention has been described with particular reference to specific examples, it is not to be limited thereby but referenec is to be had to the appended claims for a definition of its scope.

What is claimed is:

1. [A] *An* [*single package*] angel food cake mix *the ingredients of which are to be whipped together into a foam batter* comprising egg white, sugar, and a farinaceous ingredient; fatty anti-foaming agent being present in the mix at a level of 0.04–9.0% by weight of the dried egg white in the mix, wherein the aggregate level of said fatty anti-foaming agent present in the mix is below that level at which the egg white will not whip into a foam batter of substantial volume in the presence of the other mix ingredients and the cells of the egg white foam batter prouced upon whipping will not expand sufficiently upon baking, said level being above that level at which excessive swelling of the foam batter on baking and subsequent collapse of the cake on cooling is prevented.

2. A single package angel food cake mix comprising dried egg white, sugar, and a farinaceous ingredient; hexane-extractable fat being present in the mix at a level of about 0.04–1.5% by weight of the dried egg white in the mix, said mix having an aggregate fatty anti-foaming agent content of 0.04–9.0% by weight of the dried egg white in the mix, wherein the aggregiate level of fatty anti-foaming agent present in the mix is below that level at which the egg white will not whip into a foam batter of substantial volume in the presence of the other mix ingredients and the cells of the egg white foam batter produced upon whipping will not expand sufficiently upon baking, said level being above that level at which excessive swelling of the foam batter on baking and subsequent collapse of the cake on cooling is prevented.

3. A single package angel food cake mix comprising dried egg white, sugar and a farinaceous ingredient in combination with stearic acid powder, said stearic acid being present in the mix at a level of about 0.9–9.0% by weight of the dried egg white in the mix, said mix having an aggregate fatty anti-forming agent content of 0.04–9.0% by weight of the dried egg white in the mix, wherein the aggregate level of the fatty anti-foaming agent present in the mix is below that level at which the egg white will not whip into a foam batter of substantial volume in the presence of the other mix ingredients and the cells of the egg white foam batter produced upon whipping will not expand sufficiently upon baking, said level being above that level at which excessive swelling of the foam batter on baking and subsequent collapse of the cake on cooling is prevented.

4. A single package angel food cake mix according to claim 3 wherein the farinaceous ingredient comprises wheat starch.

5. A single package angel food cake mix comprising dried egg white, sugar and a farinaceous ingredient having a hexane-extractable fat content within the range of about 0.04–1.5% by weight of the dried egg white in the mix, said farinaceous ingredient being the sole farinaceous ingredient [being the sole farinaceous ingredient] of the mix, wherein the aggregate level of said fat present in the mix is below that level at which the egg white will not whip into a foam batter of substantial volume in the presence of the other mix ingredients and the cells of the egg white foam batter produced upon whipping will not expand sufficiently upon baking, said level being above that level at which excessive swelling of the foam batter on baking and subsequent collapse of the cake on cooling is prevented.

6. A single package angel food cake mix according to claim 5 wherein the farinaceous ingredient comprises wheat starch and wheat flour.

7. [A] *An* [single package angle] *angel* food cake mix according to claim [5] *1* wherein the farinaceous ingredient comprises about 60–98% wheat starch and about 40–2% wheat flour.

8. [A] *An* [single package] *angel* food cake mix according to claim [5] *1* wherein the farinaceous ingredient comprises about 25–40% wheat flour and about 75–60% solvent extracted wheat flour.

9. [A] *An* [single package] *angel* food cake mix according to claim [5] *1* wherein the farinaceous ingredient comprises wheat flour and solvent extracted wheat flour.

10. [A] *An* [single package] *angel* food cake mix according to claim [5] *1* wherein the farinaceous ingredient comprises about 80–95% wheat starch and about 20–5% wheat flour, said farinaceous ingredient having a hexane-extractable fat content within the range of about 0.5–1.0% by weight of the dried egg white in the mix.

11. [A] *An* [single package] *angel* food cake mix according to claim [5] *1* wherein the farinaceous ingredient comprises about 25–40% wheat flour and about 75–60% solvent extracted wheat flour, the hexane-extractable fat content of the farinaceous ingredient being within the range of about 1.2–1.5% of the dried egg white present in the mix.

12. [A] *An* [single package angle] *angel* food cake mix according to claim [5] *1* wherein the farinaceous ingredient comprises 100% wheat starch and the hexane-extractable fat content is within the range of 0.1–0.25%.

*13. An angel food cake mix as defined in claim 1, wherein said aggregate level of fatty anti-foaming agent in the mix includes about 0.04–1.5% hexane-extractable fat by weight of the egg white in the mix.*

*14. An angel food cake mix as defined in claim 1, wherein said aggregate level of fatty anti-foaming agent in the mix includes about 0.9–9.0% stearic acid powder by weight of the egg white in the mix.*

*15. An angel food cake mix as defined in claim 1, having a sole farinaceous ingredient the hexane-extractable fat content of which is about 0.04–1.5% by weight of the egg white in the mix.*

References Cited in the file of this patent or the original patent

UNITED STATES PATENTS

| | | |
|---|---|---|
| 1,900,094 | Bohn | Mar. 7, 1933 |
| 2,176,079 | Katzman | Oct. 17, 1939 |
| 2,355,547 | Musher | Aug. 8, 1944 |
| 2,916,380 | Finucane et al. | Dec. 8, 1959 |

FOREIGN PATENTS

| | | |
|---|---|---|
| 670,415 | Great Britain | Apr. 16, 1952 |

OTHER REFERENCES

"Food Manufacturing," July 5, 1940, page 185.